A. C. ROEBUCK.
SLIDE CHANGER.
APPLICATION FILED AUG. 20, 1906.
998,305.
Patented July 18, 1911.
5 SHEETS—SHEET 1.
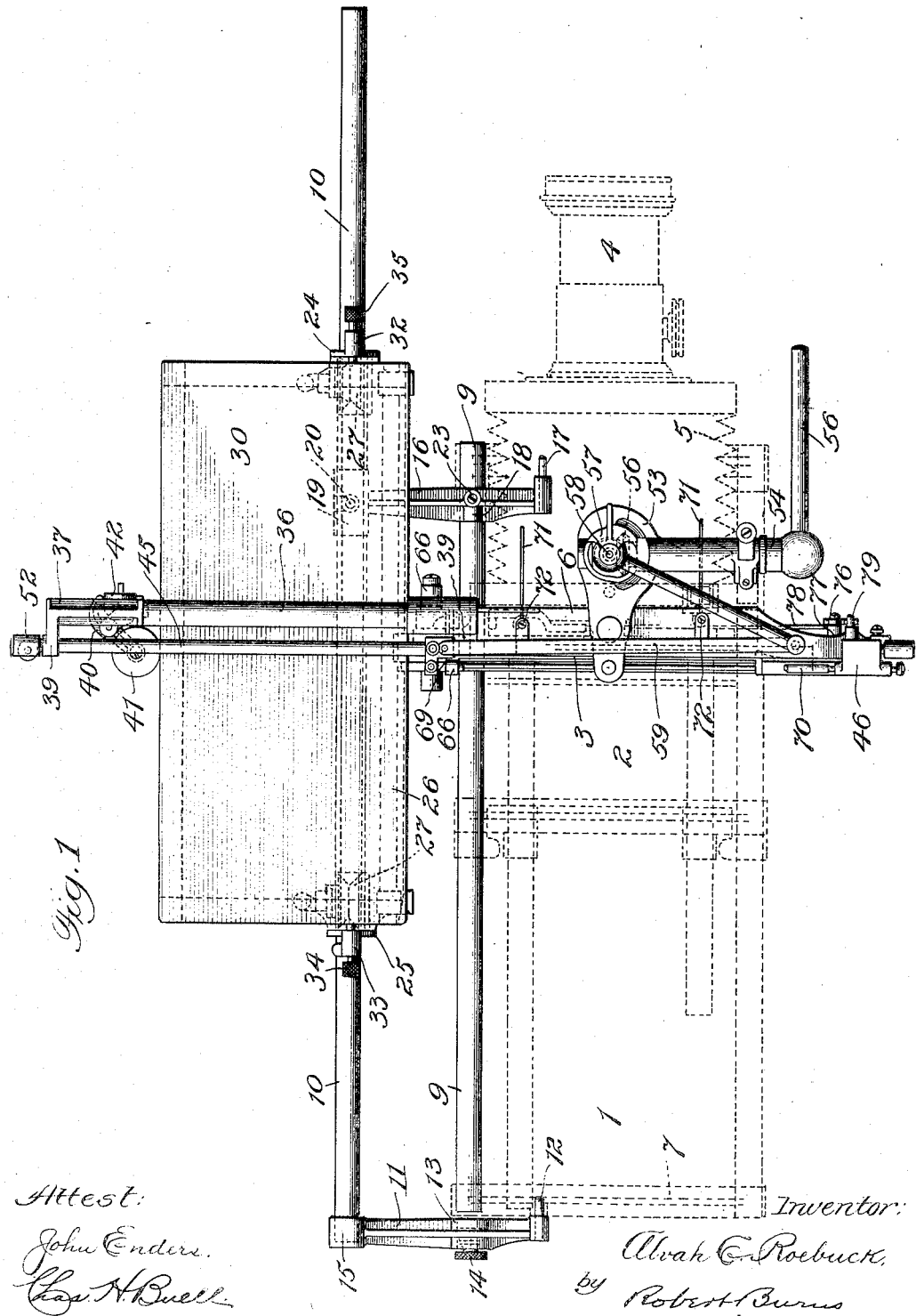

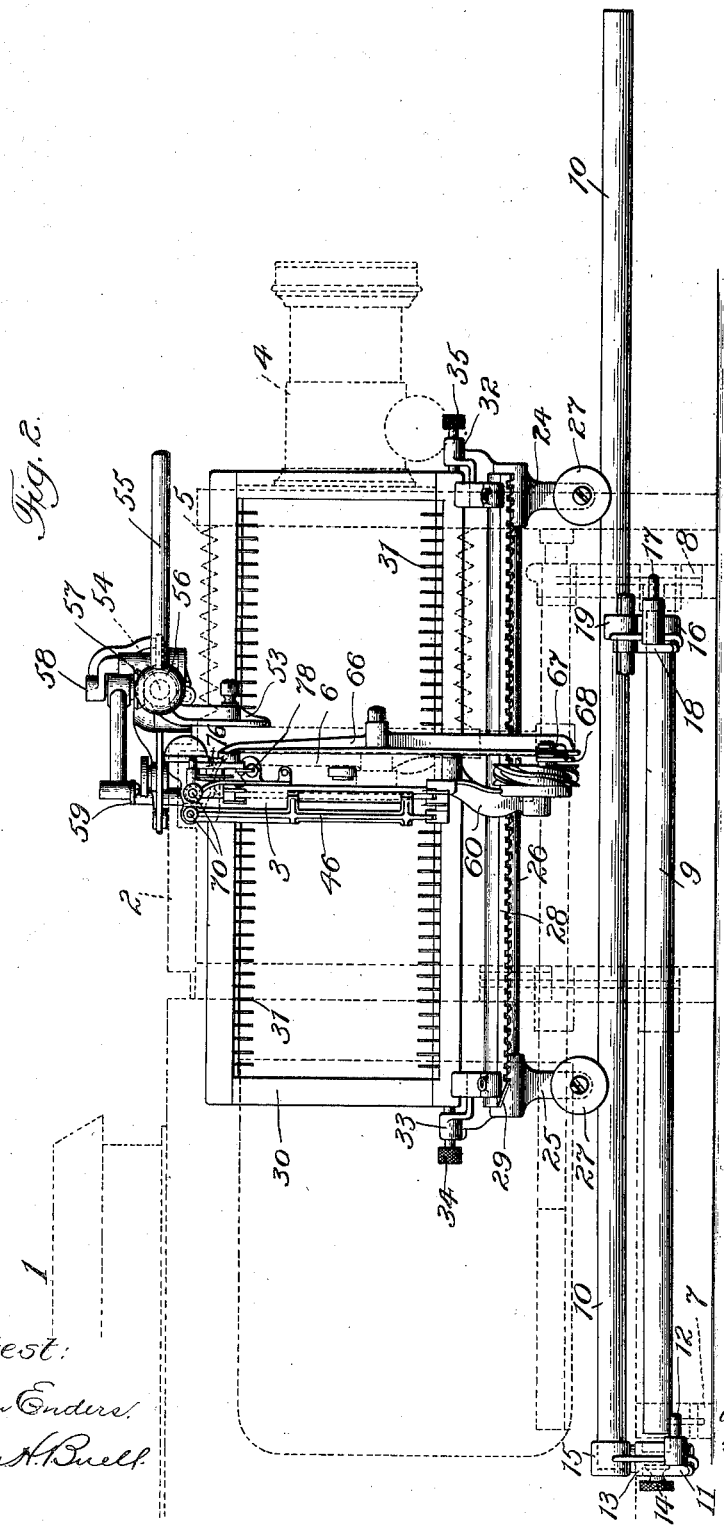

A. C. ROEBUCK.
SLIDE CHANGER.
APPLICATION FILED AUG. 20, 1906.
998,305.
Patented July 18, 1911.
5 SHEETS—SHEET 3.
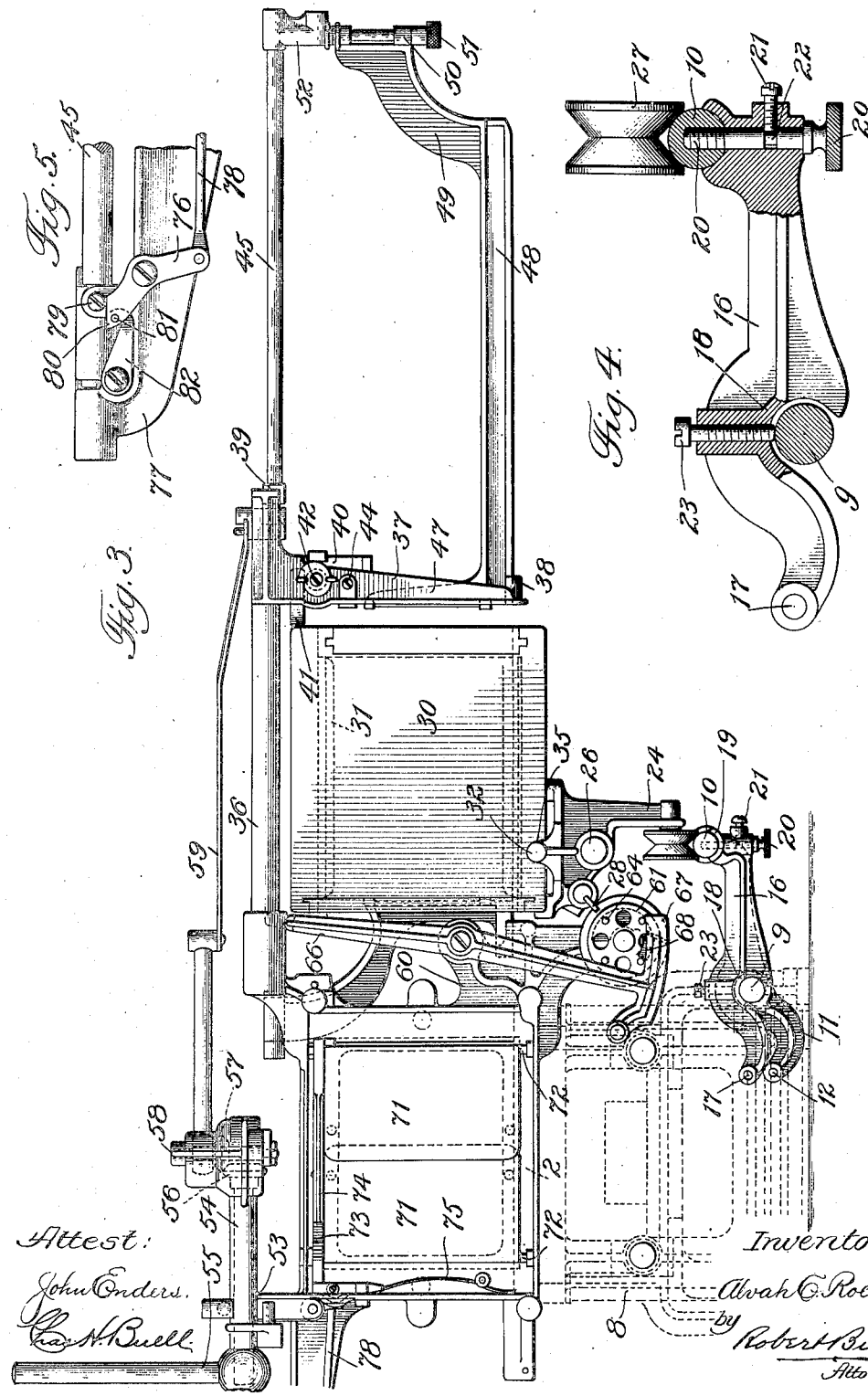

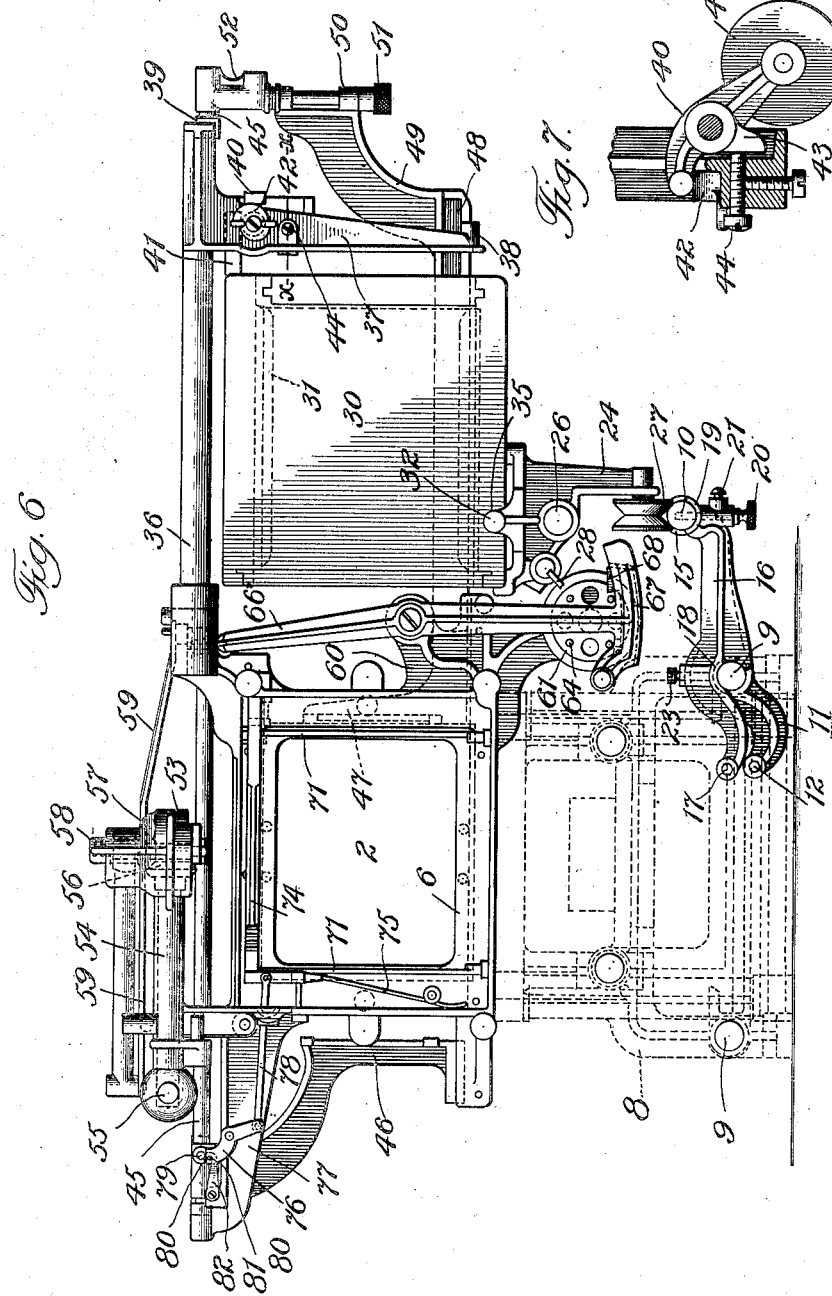

A. C. ROEBUCK.
SLIDE CHANGER.
APPLICATION FILED AUG. 20, 1906.
998,305.
Patented July 18, 1911.
5 SHEETS—SHEET 5.
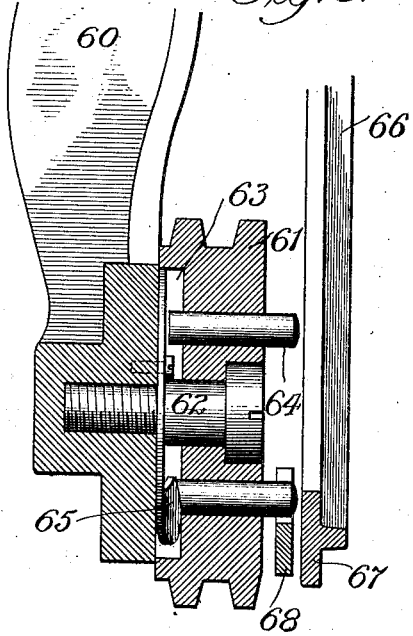
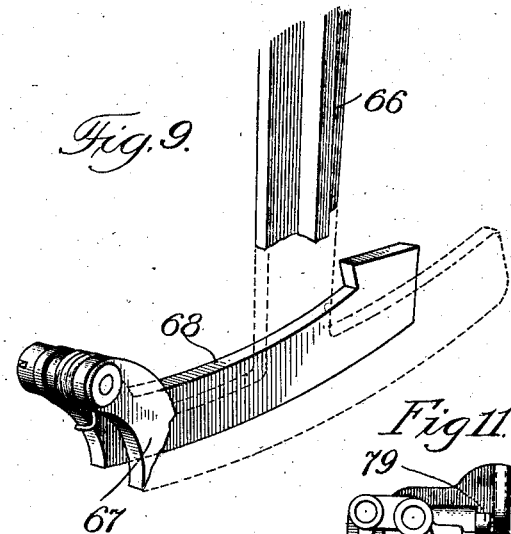
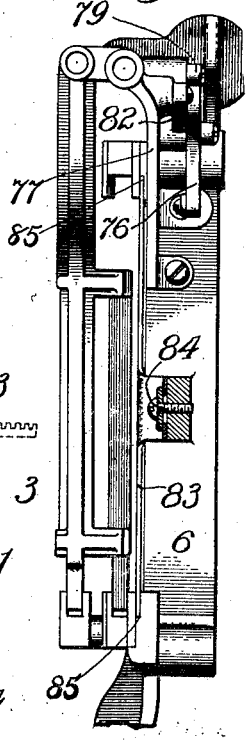
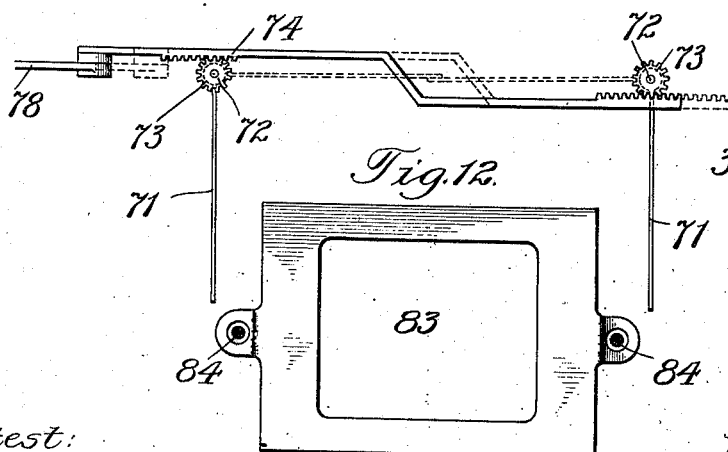
Attest:
John Enders
Chas. H. Buell
Inventor:
Alvah C. Roebuck,
by Robert Burns
Attorney.

UNITED STATES PATENT OFFICE.

ALVAH C. ROEBUCK, OF CHICAGO, ILLINOIS.

SLIDE-CHANGER.

998,305.　　　　　Specification of Letters Patent.　　Patented July 18, 1911.

Application filed August 20, 1906. Serial No. 331,258.

*To all whom it may concern:*

Be it known that I, ALVAH C. ROEBUCK, a citizen of the United States of America, and a resident of Chicago, in the county of Cook and State of Illinois, have invented certain new and useful Improvements in Slide-Changers, of which the following is a specification.

This invention relates to that type of slide changers for magic lanterns, stereopticons and the like, in which a series of picture slides or transparencies are moved from a sliding magazine or rack into an exposure position in the stereopticon and then returned to said magazine or rack in a successive and serial manner; and the present improvement has for its object to provide an effective and durable structural formation and combination of parts whereby the operations above set forth are attained in an automatic manner, and with which the completion of one operation initiates the next succeeding operation, all as will hereinafter more fully appear.

In the accompanying drawings:—Figure 1 is a plan view showing the general arrangement of the present mechanism, the optical projecting lantern being shown in dotted lines. Fig. 2, is a side elevation of the same. Fig. 3, is a front elevation showing the mechanism in position ready to move a slide or transparency from the holding magazine. Fig. 4, is an enlarged detail transverse section of the magazine track rail and its forward supporting bracket and accessories. Fig. 5, is an enlarged detail front elevation of the shutter operating mechanism and latch. Fig. 6, is a front elevation similar to Fig. 3, but showing the mechanism in position to hold the slide or transparency in exposure position in the optical projecting lantern. Fig. 7, is an enlarged detail section, inverted, on line *x—x* Fig. 6. Fig. 8, is an enlarged detail longitudinal section of the worm wheel, and its supporting, operating and locking connections. Fig. 9, is an enlarged detail perspective view of the lower end of the operating lever and pawl by which intermittent rotation is imparted to the worm wheel. Fig. 10, is a detail plan view of the hinged shutters at the front end of the lens box, and the operating mechanism thereof. Fig. 11, is a detail side view of the main frame of the slide changing mechanism, with parts in section, and illustrating the arrangement of the floating diaphragm. Fig. 12, is an elevation of the floating diaphragm.

Similar numerals of reference indicate like parts in the several views.

Referring to the drawings, 1 represents the lantern house or body; 2 the condensing lens box having at front the usual transverse way or passage 3, for the optical projecting lantern slides or transparencies, and 4, the objective or lens connected to the lens box 2 by the usual extension bellows 5, as shown in dotted lines in the different views. In the preferred form of the improvement, the front frame 6, of the lens box 2 and way 3, constitutes the main supporting frame of the present slide changing mechanism. 7 and 8, are a series of standards for supporting the above recited parts of the optical projecting lantern, and 9 are longitudinal tie rods or bars connecting said standards together, as usual in the present type of apparatus.

In the preferred form of the present invention, shown in the drawings, a pair of the standards 7 and 8, and one of the connecting bars or rods 9, constitute the sole support for the holding magazine and slide changing mechanism, with the avoidance of independent means resting upon the floor, for supporting said magazine, etc.

10, is a longitudinal rail or rod, forming the main supporting track for the magazine hereinafter described.

11, is a rear bracket secured in a lateral direction to the rear standard 7 aforesaid, by means of a pin or stud 12, on one end engaging in a corresponding recess or orifice in said standard, and in connection with an intermediate socket 13, on said bracket adapted to fit upon a stud projection on said standard, and secured in place by a screw 14, as shown. Such bracket piece constitutes the support for the rear end of the track rail 10, and to this end is formed with a socket recess 15, at its free end for the reception of the rear end of such track rail.

16, is a forward bracket secured to a forward standard 8, aforesaid by means of a pin or stud 17, on one end engaging in a corresponding recess formed therefor in said standard, in connection with an intermediate saddle recess 18 in said bracket adapted to bear upon one of the longitudinal connecting bars or rods 9 aforesaid; such bracket constitutes the support for the forward portion of the track rail 10, and to this end is formed with a seat 19 at its free end for the reception of the underside of said track rail, and adapted to leave the upper surface thereof free from obstruction.

20, is an attaching screw passing through the wall of the seat 19, and screwing into rail to secure the parts together.

21, is a holding screw, screwing laterally through the end of the bracket 16, with its point engaging in a peripheral recess 22 in the attaching screw 20, to hold the same in place, as illustrated in Fig. 4.

23, is a vertical screw passing through the wall of the saddle recess 18, and having bearing upon the rod 9, aforesaid, and adapted by its adjustment to effect a pivotal adjustment of the bracket 16, and a corresponding adjustment of the track rail 10, with the socket 15 as a fulcrum for the movement of said rail, and for the purpose of effecting a parallel alinement of the bottom of the slide magazine with the bottom of the slide passage or way 3, of the optical projecting lantern.

24 and 25, are front and rear truck frames connected together by one or more longitudinal bars or rods 26, to constitute the carriage of the slide magazine, and provided with flanged wheels 27, adapted to ride upon the track rail 10 aforesaid.

28, is a longitudinal rack bar carried by the trucks aforesaid, and provided with an incline 29 at its rear end for the purpose hereinafter stated.

30, is the magazine or holder for the series of optical projecting lantern slides or transparencies; such magazine is of an oblong rectangular form, and having open sides for the free lateral movement of the slides and the particular pusher head by which they are moved to a position of exposure in the optical projecting lantern, as hereinafter more fully set forth.

31, are a series of separator strips on the top and bottom boards of the magazine 30, to form a series of individual holding cavities for the series of optical projecting lantern slides or transparencies.

32 and 33, are alined sleeves on the truck frames 24 and 25, aforesaid; said sleeves carry the pointed screws 34 and 35, between which the magazine 30, is secured in place upon said truck frames in a longitudinally adjustable manner.

36, is a stationary over head transverse bar or rod secured to one side of the supporting frame 6, before described, and in adjacent relation to the slide passage or way 3.

37, is a depending bracket fixedly attached to the free end of the bar or rod 36 aforesaid, and provided at its lower end with a guide stirrup 38, for the lower transverse guide bar of the pusher head, hereinafter described.

39, are guide sleeves on the frame 6 and bracket 37 for the transverse guide rod of the pusher head aforesaid.

40, is an angular lever pivoted by a vertical pivot pin on the bracket 37; one arm of said lever carries a wheel 41 bearing against the side of the magazine 30, to form a lateral support for the same, in its traveling movement upon the track rail aforesaid, while the other arm of said lever has bearing against a revoluble cam 42, on the bracket 37, so that by an adjustment of said cam, a lateral adjustment of the wheel 41 and of the magazine 30, can be effected to secure a proper relative arrangement of the magazine and connecting parts of the optical projecting lantern. 43, is a secondary arm on the lever 40; and 44 is an adjustable abutment screw arranged in the path of said arm and adapted to limit the travel of the lever 40 in one direction.

45, is the transverse guide above referred to as guided in the sleeves 39 aforesaid; said guide rod is adapted to have reciprocation in said guide sleeve and carries the pair of pusher heads now to be described;—

46, is a depending pusher head arranged at one end of the guide rod 45, aforesaid, with its lower end engaged in a transverse guide groove formed therefor in the floor of the slide passage or way 3, before described.

47, is a companion pusher head carried on the other end of said guide rod 45, and having a separate relation to the pusher head 46 aforesaid, equal in extent to the width of the magazine 30, and so that with said pusher heads in a retracted position, the magazine will be capable of independent travel between said heads on the normal and continued operation of the apparatus. With a view to permit the proper length of stroke of said pusher heads, the head 47 will be provided at its lower end with an elongated transverse guide bar 48, for guiding engagement in the before described stirrup 38 of the stationary bracket 37.

49, is a vertical end extension on the guide bar 48 aforesaid, and carrying a vertical sleeve 50, in which is arranged an adjusting screw 51, adapted to engage a bracket piece 52, on the end of the guide rod 45, to effect an attachment of the parts together in a vertically adjustable manner.

53, is a bracket housing secured to the frame 6 aforesaid, in adjacent relation to and above the slide passage or way 3, aforesaid, 54 is a shaft journaled transversely in said bracket and provided at its outer end with an operating handle 55, and on its inner end with a bevel gear 56, in mesh with a similar bevel gear 57, on a vertical crank shaft 58 journaled in said housing 53, as shown.

59, is a connecting rod extending from the crank arm of the crank shaft 58, to a head secured to the guide rod 45, before described, and adapted to operatively connect the above described parts so that a movement of the operating handle 55, will effect a corresponding movement of the pusher heads in one or the other direction.

60, is a lateral bracket on the frame 6, affording support for the intermittent feed mechanism of the magazine now to be described:—

61, is a worm wheel journaled by a stud bolt 62, on the bracket 60, and provided with a recess 63, in one side for the reception of a spring pawl hereinafter described, and with a spiral thread on its periphery for engagement with the before described rack bar 28 of the magazine carriage.

64, are a circular series of studs or pins passing through the body of the worm wheel 61, in concentric relation to the axis thereof; such pins project at one side of the worm wheel to constitute a circular series of ratchet projections for operative engagement with the operating ratchet lever hereinafter described, while at the other side the said pins project into the recess 63 of the worm wheel to constitute a series of ratchet projections adapted for engagement with the spiral spring pawl 65 secured to the bracket 60. Said pawl by a serial engagement behind said projections is adapted to prevent accidental backward movement of the worm wheel.

66, is a vertical lever pivoted midway its height to the bracket 60, and having at its lower end a cross head 67, to one end of which is pivoted a spring pawl 68, the free detent end of which is adapted for serial engagement with the series of pins 64 to impart an intermittent rotation to the worm wheel in the normal operation of the apparatus. The upper end of said lever 66, is arranged in the path of the separated projections 69 and 70, moving with the before described guide rod 45, and adapted in the final movements of said guide rod to impact against the upper end of said lever, to impart intermittent oscillation thereto, and at a time when the pusher heads 46 and 47 are in a position to provide a clear path for a longitudinal movement of the magazine. In the preferred form of the projections 69 and 70, the same will be made adjustable with a view to a proper timing of the mechanism.

71, are a pair of shutters arranged at the forward end of the frame 6, aforesaid, upon vertical pivot rods 72, at the respective sides of the light opening or passage in said frame.

73, are pinions preferably secured to the upper ends of the aforesaid pivot rods 72, and operatively engaged by a transverse rack bar 74 sliding transversely in the frame 6, with the teeth of said rack bar in reversed engagement with the pinions 73, as shown in Fig. 10, so as to simultaneously close the shutters together before the light opening in the frame 6, or move said shutter in a like simultaneous manner away from such light opening.

75, is a spring, the normal tendency of which is to hold the shutters in the closed position above described.

76, is a lever pivoted to a lateral bracket 77, on the frame 6, and having connection by a link 78 with the rack bar 74, aforesaid. The upper end of said lever is arranged in the path of an operating stud or pin 79 carried by the guide rod 45 aforesaid, and so arranged that with the slide changer parts in a position in which a pictured slide or transparency is at the focal axis of the optical projecting lantern, the said stud 79 will engage and move the lever 76 to effect an opening of the shutters 71, through the intermediate mechanism just described. In the preferred construction of said lever 76, the upper end thereof will have a straight portion 80 upon which the stud 79 rides and rests to hold the shutters in their open condition in a secure manner.

81, is a lateral pin on the lever 76, adapted for engagement with a holding hook 82, pivoted to the bracket 77, to hold the shutters in their open condition during the use of the optical projecting lantern as the illuminant for a kinetoscope apparatus, or other like purposes.

83, is a floating diaphragm formed with a central opening somewhat smaller than the light passage of the frame 6 aforesaid, and secured in place at one side of said frame by means of a pair of headed set screws 84, passing through orifices in side ears of said diaphragm and screwing into the frame 6. The said orifices in the diaphragm are of a greater diameter than the shanks of the said screws, to permit of a limited independent adjustment of the diaphragm with relation to said screw shanks. Such adjustment provision is for the purpose of effecting the proper matting or framing of the plurality of light openings of a dissolving view apparatus employing a plurality of optical projecting lanterns, and the attainment of a perfect registry of the plurality of light openings upon the screen. In the preferred construction as shown in Fig. 11, the upper and lower edges of the diaphragm 83 are arranged in transverse channel 85 in the frame 6, to receive additional support against accidental displacement.

The operation of the apparatus is as follows:—A magazine 30, containing a supply of pictured slides or transparencies is secured in place on the track carriage by means of the holding screws 34 and 35, after which the carriage with the magazine so attached is pushed rearwardly into position with the track wheels 27 riding upon the track 10, and with the side of the magazine resting against the lateral supporting wheel 41. In the initial rearward movement of the carriage into place as above described, the inclined end 29 of the rack 28, is adapted to ride over the teeth of the worm wheel 61, and guide the initial teeth of said rack bar into proper operative engagement with the teeth or thread of said worm gear. In effecting such operative engagement of the rack bar and worm wheel, the required tilting adjustment of the magazine 30, is attained by a manipulation of the cam 42, angular lever 40, and lateral guide wheel 41, carried by said lever.

With the magazine in place as above described, the operator moves the hand lever 55, from the vertical position shown in Fig. 3, to the horizontal position shown in Figs. 1, 2 and 6, to effect operations of the different mechanisms as follows:—A transverse movement of the pusher mechanism, through the instrumentality of the shaft 54, bevel gears 56, 57, crank shaft 58 and link connection 59, to bring a slide or transparency from the magazine 30, into an exposure position in the lens box of the optical projecting lantern. A retractile or dormant movement of the ratchet lever 66, by an impact of the projection 69 against the upper end of said lever. An opening of the shutters 71, through the instrumentality of the rack bar 74, lever 66, link 78, and operating stud 79, of the pusher mechanism.

With the completion of the exposure of the picture slide or transparency in the optical projecting lantern, the operator imparts a movement to the hand lever 55, in a direction the reverse to that above described, to effect operations of the different mechanisms as follows:—A closing of the shutters 71, by the normal tendency of the spring 75, as the opening stress upon the lever 66, is removed. A transverse movement of the pusher mechanism through the intermediate mechanism above mentioned, to return the slide or transparency just exposed, back into its original place in the magazine. An active movement of the ratchet lever 66, by an impact of the projection 70 against the upper end of said lever, to cause a partial rotation of the worm wheel 61, and a feed of the magazine a distance sufficient to bring the next adjacent slide or transparency into proper alinement with the pusher heads of the aforesaid pusher mechanism. A continued cycle of the operations above described can then be effected to successively exhibit the series of picture slides or transparencies contained in the magazine.

Having thus fully described my said invention what I claim as new and desire to secure by Letters Patent, is:—

1. The combination of an optical projecting lantern, a magazine having movement at the side of the same and formed with closed top and bottom and sides which are open the full length of the magazine, a carriage carrying said magazine, a track for said carriage secured to the side of the optical projecting lantern, a transversely arranged pusher mechanism mounted on the optical projecting lantern with pusher heads having movement between the closed top and bottom of the magazine, and means for imparting intermittent longitudinal movement to the magazine.

2. The combination of an optical projecting lantern, a magazine having movement at the side of the same and formed with closed top and bottom and sides which are open the full length of the magazine, a carriage carrying said magazine a track for said carriage secured at one end in a lateral bracket at the side of the optical projecting lantern and supported at its other end in a vertically adjustable manner, a transversely arranged pusher mechanism mounted on the optical projecting lantern with pusher heads having movement between the closed top and bottom of the magazine, and means for imparting intermittent longitudinal movement to the magazine.

3. The combination of an optical projecting lantern, a magazine having movement at the side of the same and formed with closed top and bottom and sides which are open the full length of the magazine, a carriage carrying said magazine, and track for said carriage secured at one end in a lateral bracket at the side of the optical projecting lantern and supported at its other end in a vertically adjustable manner by means of a pivoted bracket and adjusting screw, a transversely arranged pusher mechanism mounted on the optical projecting lantern with pusher heads having movement between the closed top and bottom of the magazine, and means for imparting intermittent longitudinal movement to the magazine.

4. The combination of an optical projecting lantern, a longitudinal track rail secured to one side of the same, a carriage riding on said rail, a magazine mounted on said carriage and formed with closed top and bottom and sides which are open the full length of the magazine, a guide wheel carried by the optical projecting lantern and adapted to hold the magazine against a tilting movement, a transversely arranged pusher mechanism mounted on the optical projecting lantern, and means for imparting an intermittent longitudinal movement to the carriage and magazine.

5. The combination of an optical projecting lantern, a longitudinal track rail secured to the side of the same, a carriage and formed with closed top and bottom and sides which are open the full length of the magazine riding on said rail, a magazine mounted on said carriage, a lever pivoted to the optical projecting lantern, a cam engaging one end of the lever, a guide wheel carried at the other end of said lever and bearing against the side of the magazine, a transversely arranged pusher mechanism mounted on the optical projecting lantern, and means for imparting an intermittent longitudinal movement to the carriage and magazine.

6. The combination of an optical projecting lantern, a magazine guided longitudinally at the side of the same and formed with closed top and bottom and sides which are open the full length of the magazine, a transversely arranged pusher mechanism comprising a pair of vertical pusher heads, a guide rod moving in guides on the optical projecting lantern and carrying said pusher heads in separated relation, a manually actuated mechanism for imparting reciprocation to said guide rod, and means for imparting an intermittent longitudinal movement to the magazine.

7. The combination of an optical projecting lantern, a magazine guided longitudinally at the side of the same and formed with closed top and bottom and sides which are open the full length of the magazine, a transversely arranged pusher mechanism comprising a pair of vertical pusher heads, a guide rod moving in guides on the optical projecting lantern and carrying said pusher heads in separated relation, a transverse guide bar carrying at one end one of said pusher heads and at the other end an extension adapted for attachment to the guide rod aforesaid, a guide stirrup on the optical projecting lantern engaging said guide bar, a manually actuated mechanism for imparting reciprocation to said guide rod, and means for imparting an intermittent longitudinal movement to the magazine.

8. The combination of an optical projecting lantern, a magazine guided longitudinally at the side of the same and formed with closed top and bottom and sides which are open the full length of the magazine, a transversely arranged pusher mechanism comprising a pair of vertical pusher heads, a guide rod moving in guides on the optical projecting lantern and carrying said pusher heads in separated relation, a transverse guide bar carrying at one end one of said pusher heads and at the other end an extension provided with a vertical sleeve, a bracket piece on the guide rod, a screw connecting said bracket piece and vertical sleeve together, a guide stirrup on the optical projecting lantern engaging said guide bar, a manually actuated mechanism for imparting reciprocation to said guide rod, and means for imparting an intermittent longitudinal movement to the magazine.

9. The combination of an optical projecting lantern, a magazine guided longitudinally at the side of the same and formed with closed top and bottom and sides which are open the full length of the magazine, a transversely arranged pusher mechanism comprising a pair of vertical pusher heads, a guide rod moving in guides on the optical projecting lantern and carrying said pusher heads in separated relation, a manually actuated mechanism for imparting reciprocation to said guide rod, the same comprising a bracket piece secured to the optical projecting lantern, a transverse shaft journaled in said bracket, a handle at one end of said shaft, a vertical shaft journaled in said bracket, bevel gears connecting said shafts together, a crank arm on the vertical shaft and a connecting link extending from said crank arm to the guide rod aforesaid, and means for imparting intermittent longitudinal movement to the magazine.

10. The combination of an optical projecting lantern, a magazine guided longitudinally at the side of the same and formed with closed top and bottom and sides which are open the full length of the magazine, a transversely arranged pusher mechanism comprising a pair of vertical pusher heads, a guide rod moving in guides on the optical projecting lantern and carrying said pusher heads in separated relation, a transverse guide bar carrying at one end one of said pusher heads and at the other end an extension adapted for attachment to the guide rod aforesaid, a guide stirrup on the optical projecting lantern engaging said guide bar, a manually actuated mechanism for imparting reciprocation to said guide rod the same comprising a bracket piece secured to the optical projecting lantern, a transverse shaft journaled in said bracket, a handle at one end of said shaft, a vertical shaft journaled in said bracket, bevel gears connecting said shafts together a crank arm on the vertical shaft and a connecting link extending from said crank arm to the guide rod aforesaid, and means for imparting intermittent longitudinal movement to the magazine.

11. The combination of an optical projecting lantern, a magazine guided longitudinally at the side of the same and formed with closed top and bottom and sides which are open the full length of the magazine, a transversely arranged pusher mechanism comprising a pair of vertical pusher heads, a guide rod moving in guides on the optical projecting lantern and carrying said pusher heads in separated relation, a transverse guide bar carrying at one end one of said pusher heads and at the other end an extension provided with a vertical sleeve, a bracket piece on the guide rod, a screw connecting said bracket piece and vertical sleeve together in a vertically adjustable manner, a guide stirrup on the optical projecting lantern engaging said guide bar, a manually actuated mechanism for imparting reciprocation to said guide rod, the same comprising a bracket piece secured to the optical projecting lantern, a transverse shaft journaled in said bracket, a handle at one end of said shaft, a vertical shaft journaled in said bracket, bevel gears connecting said shafts together, a crank arm on the vertical shaft and a connecting link extending from said crank arm to the guide rod aforesaid, and means for imparting intermittent longitudinal movement to the magazine.

12. The combination of an optical projecting lantern, a longitudinal track rail secured at one side of the same, a carriage riding on said rail, a magazine formed with closed top and bottom and sides which are open the full length of the magazine and extending the full length of the mazagine and mounted on said carriage, a transversely arranged pusher mechanism comprising a pair of vertical pusher heads, a guide rod moving in guides on the optical projecting lantern and carrying said pusher heads in separated relation, a manually actuated mechanism for imparting reciprocation to said guide rod, and means for imparting an intermittent longitudinal movement to the carriage and magazine.

13. The combination of an optical projecting lantern, a magazine extending the full legnth of the magazine and guided longitudinally at the side of the same and formed with closed top and bottom and sides which are open the full length of the magazine, a transversely arranged pusher mechanism, a rack bar carried by the magazine, a worm wheel carried by the optical projecting lantern and having operative engagement with said rack bar, and means actuated by the pusher mechanism for imparting intermittent revolution to the worm wheel.

14. The combination of an optical projecting lantern, a magazine extending the full length of the magazine and guided longitudinally at the side of the same and formed with closed top and bottom and sides which are open the full length of the magazine, a transversely arranged pusher mechanism, a rack bar carried by the magazine and formed with an inclined end, a worm wheel carried by the optical projecting lantern and having operative engagement with said rack bar, and means actuated by the pusher mechanism for imparting intermittent revolution to the worm wheel.

15. The combination of an optical projecting lantern, a magazine extending the full length of the magazine and guided longitudinally at the side of the same and formed with closed top and bottom and sides which are open the full length of the magazine, a transversely arranged pusher mechanism, a rack bar carried by the magazine, a worm wheel carried by the optical projecting lantern and having operative engagement with said rack bar, and means actuated by the pusher mechanism for imparting intermittent revolution to the worm wheel, the same comprising a lever pivoted to the optical projecting lantern with one end arranged in the path of the pusher mechanism, a spring pawl carried at the other end of said lever, and a circular series of pins or detents having fixed relation to the worm wheel and adapted for engagement with the spring pawl aforesaid.

16. The combination of an optical projecting lantern, a magazine extending the full length of the magazine and guided longitudinally at the side of the same and formed with closed top and bottom and sides which are open the full length of the magazine, a transversely arranged pusher mechanism comprising a pair of vertical pusher heads, a guide rod moving in guides on the optical projecting lantern and carrying said heads in separated relation, a manually actuated mechanism for imparting reciprocation to said guide rod, a rack bar carried by the magazine, a worm wheel carried by the optical projecting lantern, and means for imparting intermittent revolution to the worm wheel comprising a lever pivoted to the optical projecting lantern, a spring pawl on one end of said lever, a circular series of pins or detents having fixed relation to the worm wheel and adapted for engagement with the spring pawl aforesaid, and lugs carried in spaced relation in the guide rod aforesaid and adapted to impart intermittent oscillation to the lever aforesaid.

17. The combination of an optical projecting lantern, a magazine extending the full length of the magazine and guided longitudinally at the side of the same and formed with closed top and bottom and sides which are open the full length of the magazine, a transversely arranged pusher mechanism comprising a pair of vertical pusher heads, a guide rod moving in guides on the optical projecting lantern and carrying said heads in separated relation, a manually actuated mechanism for imparting reciprocation to said guide rod, a rack bar carried by the magazine and formed with an inclined end, a worm wheel carried by the optical projecting lantern, and means for imparting intermittent revolution to the worm wheel the same comprising a lever pivoted to the optical projecting lantern, a spring pawl on one end of said lever, a circular series of pins or detents having fixed relation to the worm wheel and adapted for engagement with the spring pawl aforesaid, and lugs carried in spaced relation on the guide rod aforesaid and adapted to impart intermittent oscillation to the lever aforesaid.

18. The combination of an optical projecting lantern, a longitudinal track rail secured at one end in a lateral bracket at the side of the optical projecting lantern and supported near its other end in a vertically adjustable manner, a carriage riding on said rail, a magazine mounted on said carriage and formed with closed top and bottom and sides which are open the full length of the magazine, a transversely arranged pusher mechanism, a rack bar carried by the magazine, a worm wheel carried by the optical projecting lantern and having operative engagement with said rack bar, and means actuated by the pusher mechanism for imparting intermittent revolution to the worm wheel.

19. The combination of an optical projecting lantern, a longitudinal track rail secured at one end in a lateral bracket at the side of the optical projecting lantern and supported near its other end in a vertically adjustable manner, a carriage riding on said rail a magazine mounted on the carriage and formed with closed top and bottom and sides which are open the full length of the magazine, a transversely arranged pusher mechanism, a rack bar carried by the magazine and formed with an inclined end, a worm wheel carried by the optical projecting lantern and having operative engagement with said rack bar, and means actuated by the pusher mechanism for imparting intermittent revolution to the worm wheel.

20. The combination of an optical projecting lantern, a longitudinal track rail secured at one end in a lateral bracket at the side of the optical projecting lantern and supported near its other end in a vertically adjustable manner, a carriage riding on said rail, a magazine mounted on said carriage and formed with closed top and bottom and sides which are open the full length of the magazine, a transversely arranged pusher mechanism, a rack bar carried by the magazine, a worm wheel carried by the optical projecting lantern, and having operative engagement with said rack bar, and means actuated by the pusher mechanism for imparting intermittent revolution to the worm wheel, the same comprising a lever pivoted to the stereopticon with one end arranged in the path of the pusher mechanism, a spring pawl carried at the other end of said lever, and a circular series of pins or detents having fixed relation to the worm wheel and adapted for engagement with the spring pawl aforesaid.

21. The combination of an optical projecting lantern, a longitudinal track rail secured at one end in a lateral bracket at the side of the optical projecting lantern and supported near its other end in a vertically adjustable manner, a carriage riding on said rail a magazine mounted on the carriage and formed with closed top and bottom and sides which are open the full length of the magazine, a transversely arranged pusher mechanism, a rack bar carried by the magazine and formed with an inclined end, a worm wheel carried by the optical projecting lantern and having operative engagement with said rack bar, and means actuated by the pusher mechanism for imparting intermittent revolution to the worm wheel, the same comprising a lever pivoted to the stereopticon with one end arranged in the path of the pusher mechanism, a spring pawl carried at the other end of said lever, and a circular series of pins or detents having fixed relation to the worm wheel and adapted for engagement with the spring pawl aforesaid.

22. The combination of an optical projecting lantern, a longitudinal track rail secured to one side of the same, a carriage riding on said rail, a magazine extending the full length of the magazines and mounted on said carriage and formed with closed top and bottom and sides which are open the full length of the magazine, a guide wheel carried by the optical projecting lantern and adapted to hold the magazine against a tilting movement, a transversely arranged pusher mechanism, a rack bar carried by the magazine, a worm wheel carried by the optical projecting lantern and having operative engagement with said rack bar, and means actuated by the pusher mechanism for imparting intermittent revolution to the worm wheel.

23. The combination of an optical projecting lantern, a longitudinal track rail secured to one side of the same, a carriage riding on said rail, a magazine extending the full length of the magazine and mounted on said carriage and formed with closed top and bottom and sides which are open the full length of the magazine, a guide wheel carried by the optical projecting lantern and adapted to hold the magazine against a tilting movement, a transversely arranged pusher mechanism, a rack bar carried by the magazine, a worm wheel carried by the optical projecting lantern and having operative engagement with said rack bar, and means actuated by the pusher mechanism for imparting intermittent revolution to the worm wheel, the same comprising a lever pivoted to the optical projecting lantern with one end arranged in the path of the pusher mechanism, a spring pawl carried at the other end of said lever, and a circular series of pins or detents having fixed relation to the worm wheel and adapted for engagement with the spring pawl aforesaid.

24. The combination of an optical projecting lantern, a longitudinal track rail secured to one side of the same, a carriage riding on said rail, a magazine extending the full length of the magazine and mounted on said carriage and formed with closed top and bottom and sides which are open the full length of the magazine, a guide wheel carried by the optical projecting lantern and adapted to hold the magazine against a tilting movement, a transversely arranged pusher mechanism comprising a pair of vertical pusher heads, a guide rod moving in guides on the optical projecting lantern and carrying said heads in separated relation, a manually actuated mechanism for imparting reciprocation to said guide rod, a rack bar carried by the magazine, a worm wheel carried by the optical projecting lantern, and means for imparting intermittent revolution to the worm wheel comprising a lever pivoted to the optical projecting lantern, a spring pawl on one end of said lever, a circular series of pins or detents having fixed relation to the worm wheel and adapted for engagement with the spring pawl aforesaid, and lugs carried in spaced relation on the guide rods aforesaid and adapted to impart intermittent oscillation to the lever aforesaid.

25. The combination of an optical projecting lantern, a longitudinal track rail secured to the side of the same, a carriage riding on said rail, a magazine extending the full length of the magazine and mounted on said carriage and formed with closed top and bottom and sides which are open the full length of the magazine, a lever pivoted to the optical projecting lantern, a cam engaging one end of the lever, a guide wheel carried at the other end of said lever and bearing against the side of the magazine, a transversely arranged pusher mechanism, a rack bar carried by the magazine, a worm wheel carried by the optical projecting lantern and having operative engagement with said rack bar, and means actuated by the pusher mechanism for imparting intermittent revolution to the worm wheel.

26. The combination of an optical projecting lantern, a longitudinal track rail secured to the side of the same, a carriage riding on said rail, a magazine extending the full length of the magazine and mounted on said carriage and formed with closed top and bottom and sides which are open oted to the optical projecting lantern, a cam engaging one end of the lever, a guide wheel carried at the other end of said lever and bearing against the side of the magazine, a transversely arranged pusher mechanism comprising a pair of vertical pusher heads, a guide rod moving in guides on the optical projecting lantern and carrying said heads in separated relation, a manually actuated mechanism for imparting reciprocation to said guide rod, a rack bar carried by the magazine, a worm wheel carried by the optical projecting lantern, and means for imparting intermittent revolution to the worm wheel comprising a lever pivoted to the optical projecting lantern, a spring pawl on one end of said lever, a circular series of pins or detents having fixed relation to the worm wheel and adapted for engagement with the spring pawl aforesaid, and lugs arranged in spaced relation on the guide rod aforesaid and adapted to impart intermittent oscillation to the lever aforesaid.

27. The combination of an optical projecting lantern having a lens box provided with a light opening, a pair of shutters arranged on pivots at the margin of said light opening, a reversed rack and pinion connection imposing simultaneous movement on the shutters, a magazine guided longitudinally at the side of the optical projecting lantern and formed with closed top and bottom and sides which are open the full length of the magazine, a pusher mechanism arranged transversely of the optical projecting lantern, means for manually actuating said pusher mechanism, and an operative connection between said pusher mechanism and the rack aforesaid.

28. The combination of an optical projecting lantern having a lens box provided with a light opening, a pair of shutters arranged on pivots at the margin of said light opening, a reversed rack and pinion connection imposing simultaneous movement on the shutters, a magazine guided longitudinally at the side of the optical projecting lantern and formed with closed top and bottom and sides which are open the full length of the magazine, a pusher mechanism arranged transversely of the optical projecting lantern, means for manually actuating said pusher mechanism, a lever having one arm arranged in the path of the pusher mechanism, and a link connecting the other arm of said lever with the rack aforesaid.

29. The combination of an optical projecting lantern having a lens box provided with a light opening, a pair of shutters arranged on pivots at the margin of said light openings, a connection imposing simultaneous movement on the pair of shutters, a spring tending to hold said shutters in a closed position, a magazine guided longitudinally at the side of the optical projecting lantern and formed with closed top and bottom and sides which are open the full length of the magazine, a pusher mechanism arranged transversely of the optical projecting lantern, means for manually actuating said pusher mechanism, and operative connections between said pusher mechanism and the shutters.

30. The combination of an optical projecting lantern having a lens box provided with a light opening, a pair of shutters arranged on pivots at the margin of the light opening, a reversed rack and pinion connection imposing simultaneous movement on the shutters, a spring tending to hold said shutters in a closed position, a magazine guided longitudinally at the side of the optical projecting lantern and formed with closed top and bottom and sides which are open the full length of the magazine, a pusher mechanism arranged transversely of the optical projecting lantern, means for manually actuating said pusher mechanism, and an operative connection between said pusher mechanism and the rack aforesaid.

31. The combination of an optical projecting lantern having a lens box provided with a light opening, a pair of shutters arranged on pivots at the margin of the light opening, a reversed rack and pinion connection imposing simultaneous movement on the shutters, a spring tending to hold said shutter in a closed position, a magazine guided longitudinally at the side of the optical projecting lantern and formed with closed top and bottom and sides which are open the full length of the magazine, a pusher mechanism arranged transversely of the optical projecting lantern, means for manually actuating said pusher mechanism, a lever having one arm arranged in the path of the pusher mechanism, and a link connecting the other arm of said lever with the rack aforesaid.

32. The combination of an optical projecting lantern having a lens box provided with a light opening, a pair of shutters arranged on pivots at the margin of said light openings, a connection imposing simultaneous movement on the pair of shutters, a magazine guided longitudinally at the side of the optical projecting lantern and formed with closed top and bottom and sides, which are open the full length of the magazine, a pusher mechanism arranged transversely of the optical projecting lantern, means for manually actuating said pusher mechanism, operative connections between said pusher mechanism and the shutters, and a latch adapted to engage and hold the shutters in an open position.

33. The combination of an optical projecting lantern having a lens box provided with a light opening, a pair of shutters arranged on pivots at the margin of said light opening, a reversed rack and pinion connection imposing simultaneous movement on the shutters, a magazine guided longitudinally at the side of the optical projecting lantern and formed with closed top and bottom and sides which are open the full length of the magazine, a pusher mechanism arranged transversely of the optical projecting lantern, means for manually actuating said pusher mechanism, an operative connection between said pusher mechanism and the rack aforesaid, and a latch adapted to engage and hold the shutters in an open position.

34. The combination of an optical projecting lantern having a lens box provided with a light opening, a pair of shutters arranged on pivots at the margin of said light opening, a reversed rack and pinion connection imposing simultaneous movement on the shutters, a magazine guided longitudinally at the side of the optical projecting lantern and formed with closed top and bottom and sides which are open the full length of the magazine, a pusher mechanism arranged transversely of the optical projecting lantern, means for manually actuating said pusher mechanism, a lever having one arm arranged in the path of the pusher mechanism, a link connecting the other arm of said lever with the rack aforesaid, and a latch adapted to engage and hold the shutters in an open position.

Signed at Chicago, Illinois, this 16th day of August 1906.

ALVAH C. ROEBUCK.

Witnesses:
ROBERT BURNS,
HENRY MOE.